T. SLOPER.
HYDROAEROPLANE.
APPLICATION FILED OCT. 25, 1916.
1,273,549.
Patented July 23, 1918.
2 SHEETS—SHEET 1.
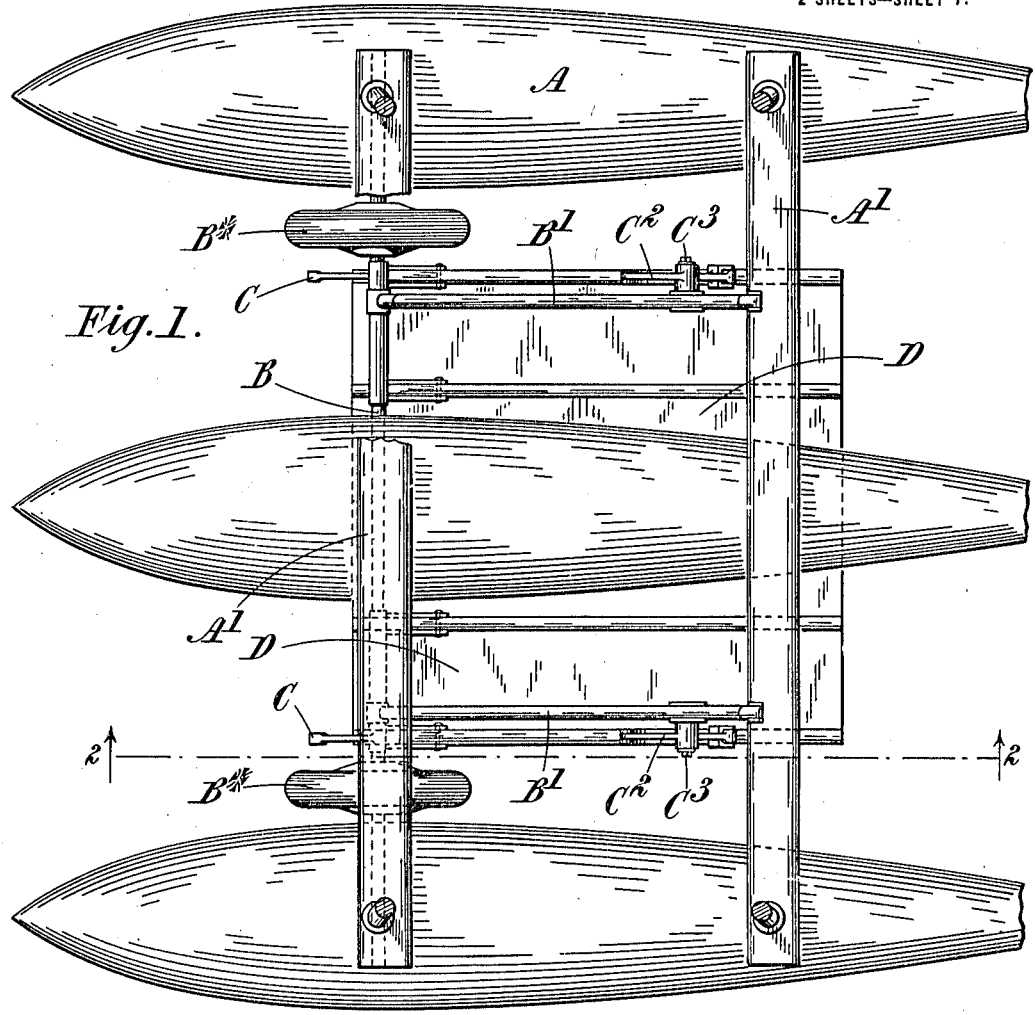
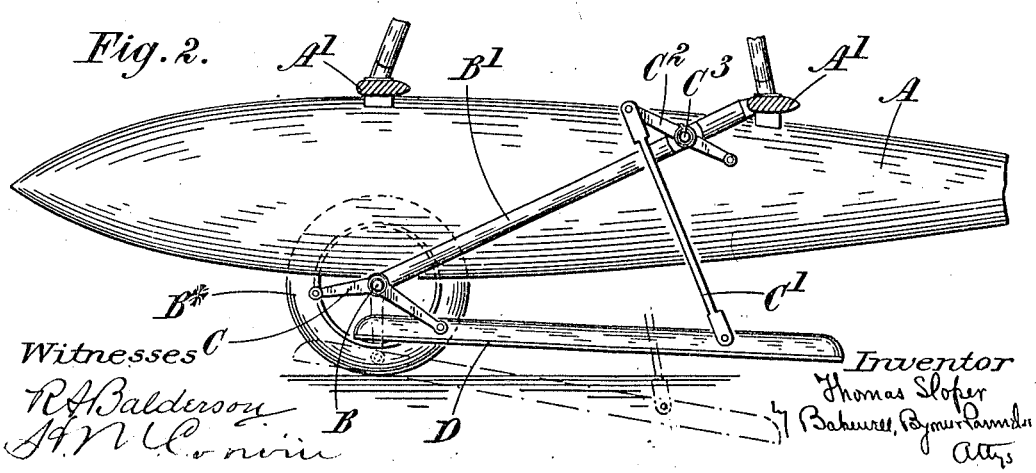

T. SLOPER.
HYDROAEROPLANE.
APPLICATION FILED OCT. 25, 1916.
1,273,549.
Patented July 23, 1918.
2 SHEETS—SHEET 2.
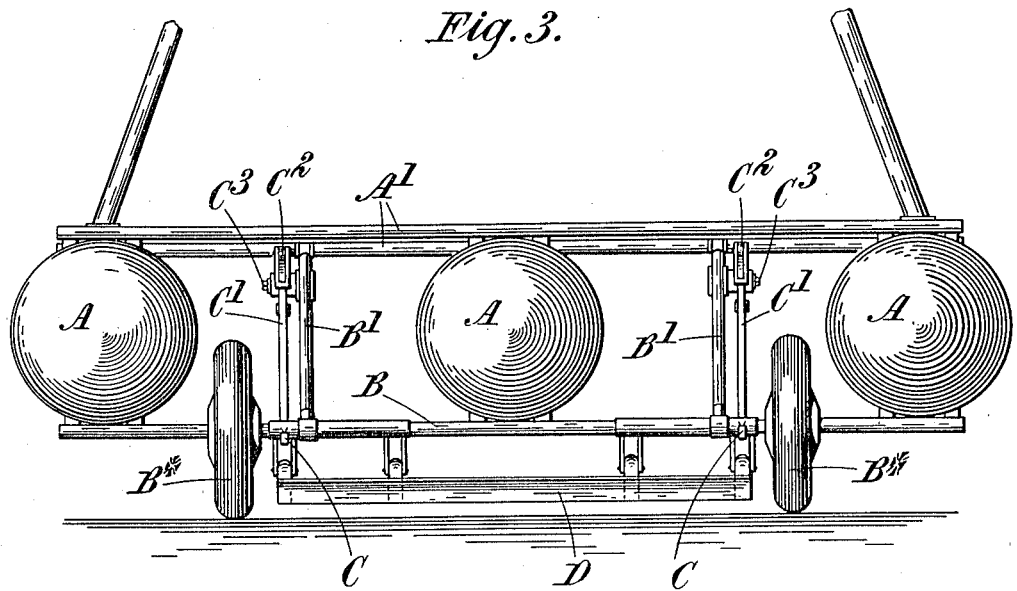
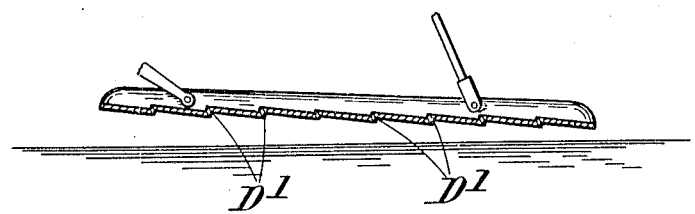
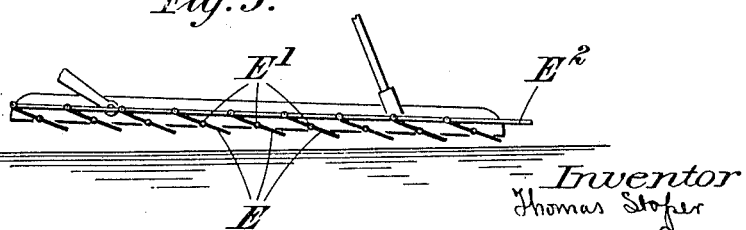

UNITED STATES PATENT OFFICE.

THOMAS SLOPER, OF DEVIZES, ENGLAND.

HYDROAEROPLANE.

1,273,549.     Specification of Letters Patent.     Patented July 23, 1918.

Application filed October 25, 1916. Serial No. 127,566.

*To all whom it may concern:*

Be it known that I, THOMAS SLOPER, a subject of the King of England, residing at Devizes, Wiltshire, England, have invented certain new and useful Improvements in Hydroaeroplanes, of which the following is a specification.

This invention is for improvements in or relating to hydro-aeroplanes and has for its object to provide means whereby hydro-aeroplanes may be made to leave the water more easily than has been possible up to the present.

It is well-known that when floats, for example of circular cross-section and stream-line shape, are employed, it is found that the hydro-aeroplane has difficulty in leaving the water. On the other hand, floats of this form have the advantage that they offer comparatively little air-resistance and it is more easy to build them in such manner that they have considerable structural strength without undue weight than it is to build a correspondingly strong flat-bottomed float.

It has been proposed to assist a hydro-aeroplane to leave the water by means of a depending swinging frame arranged between the floats and provided with louvers to act against the water, but these frames added to the air-resistance when the hydro-aeroplane was in the air, and therefore provision had to be made for swinging them into a horizontal position, thus giving the operator a further element to attend to. It has also been proposed to provide narrow planes situated between the floats of a hydro-aeroplane, but not so mounted as to lift the floats entirely clear of the water.

According to the present invention, there is combined with the floats of a hydro-aeroplane and a lifting-plane for raising the floats from the water, means for bodily raising or lowering the lifting-plane to suit the speed at which the hydro-aeroplane is traveling in the water. Such means may be arranged to bodily move the lifting-plane without altering its angle.

Preferably the plane is of considerable length relatively to the length of the floats and can be swung about its front support to vary the angle relatively to the floats. As every element offers wind-resistance, an important feature with reference to the plane mounted to move bodily as described, is that it is of sufficient area not only to operate as a lifting-plane in the water but to operate with sufficient efficiency as a lifting-plane in the air to nullify, from a practical point of view, its own air-resistance.

In the accompanying drawings, which illustrate one method of carrying out this invention:—

Figure 1 is a plan of the floats and plane, the parts of the machine above the floats being removed;

Fig. 2 is a section on the line 2—2 of Fig. 1;

Fig. 3 is a front elevation of the parts shown in Fig. 1,

Fig. 4 is a section through a modified form of plane, and

Fig. 5 is a section through yet another modified form of plane.

The same letters indicate the same parts throughout the drawings.

The floats A, which in the arrangement shown in the drawings are three in number, are secured to upper transverse-members $A^1$ which carry the framing of the machine. To the under-side of the floats is secured an axle-member B on which are mounted the wheels B* for landing and starting purposes. The floats are interposed between the axle B and the members A as cushioning devices, and they may be built up in any desired manner. Two thrust-members $B^1$ are provided to take the backward thrust of the wheels on the axle B. These members constitute a yielding-connection between the said axle and the rear transverse-member $A^1$ as they are hinged to the axle and the said member $A^1$ so that the wheel-axle can rise and fall with the cushioning action of the floats.

Mounted on the wheel-axle B are bell-crank levers C one being situated near each wheel. One arm of each lever is pivoted to the forward end of a plane D, the rear end of which is supported by links $C^1$ situated one on each side of the plane. The lower ends of the links are pivoted to the plane and the upper ends are pivoted to rocking-levers $C^2$ which are pivoted at $C^3$ one to each of the members $B^1$. The free ends of the levers $C^2$ and the free arms of the bell-crank levers C are connected to any convenient control-mechanism, not shown in the drawings, so that they can be swung into various positions to adjust the height and angle of the plane D. The control-mechanism may link the levers C, $C^2$ together, so that they always move in direct relation to one another, or they may be separately adjustable so that either the forward or the back end of the plane may be independently adjusted except in so far as one end will always be swung up or down by movement of the other end.

It will be seen that by swinging the levers C and C² simultaneously in a clockwise direction, the plane D can be bodily lowered. This is a feature of considerable importance because it is found that the height of the plane relatively to the floats requires to be adjusted for different speeds on the water and the means for lowering it may be either arranged to simultaneously vary the angle by swinging the whole plane about its front point of pivoting, or it may be arranged to retain the plane at the same angle according to what is found to be most convenient by practical experience. If the levers C and C² are independent of each other so that they can be separately adjusted, then obviously the plane can be lowered and its angle also altered at will, but probably it will be found convenient to interconnect the levers C and C² so that when one is moved the other is also moved in such wise as to bodily move the plane without changing the angle. Even so, the lever C² could then be further arranged so that at will it can be disconnected from the interconnecting member for separate adjustment.

The lowest position to which the plane can be brought is indicated in chain-line in the drawings and in this position it is also shown at a more steeply inclined angle than that occupied by it as shown in full lines. The plane when in the lowered position will lift the floats and wheels entirely out of the water before it leaves the water itself, but for landing purposes it is preferably raised to approximately the position shown in full lines.

It will be seen that the area of the plane D is considerable as compared with the length of the floats so that it has sufficient lifting power for leaving the water and also operates sufficiently as a lifting-plane in the air to nullify, from a practical point of view, its own air-resistance. If the aviator finds that the lifting-power of the plane in the air can be increased by re-adjusting it after leaving the water, it can be so re-adjusted during flight and in any case it is intended to be raised before attempting to land on the ground.

Preferably the plane is made of some bullet-proof, or approximately bullet-proof, material and by situating it in the center of the machine between the two outer floats, it can thus serve as a protection for the aviator who would be directly over it.

If desired, the under-side of the plane may be stepped, and if it is made of sheet metal these steps may be formed by corrugating the metal so that corresponding steps appear on the upper side, as shown in Fig. 4 of the drawings. The risers of the steps are shown perforated at $D^1$ to admit air beneath the steps. The upper side may be covered with canvas to give it a smooth surface for the purpose of decreasing wind-resistance.

Obviously the plane could be divided centrally and mounted as two separate planes between the two outer floats and the central float as desired, but when the whole plane is set at a level lower than the floats it is convenient to construct it in one as shown.

Although the plane shown in the drawings is built up in such manner as to practically constitute one piece, it will be appreciated that it can be built up of slats placed one behind the other and transverse to the direction of travel. In Fig. 5 such an arrangement is shown wherein the slats E are set at an angle relatively to the general angle of the plane thereby producing a result similar to the stepped plane shown in Fig. 4. For the purpose of this invention such a construction is considered as a single plane as distinct from a number of slat-like planes superimposed with a space between them and mounted in a frame so that their planing surfaces lie approximately at right angles to the frame in which they are mounted.

The slats E may be pivoted at $E^1$ and connected to a rod $E^2$ whereby the angle at which they lie relatively to the general angle of the plane can be adjusted.

What I claim as my invention and desire to secure by Letters Patent is:—

1. In a hydroplane the combination of floats for supporting the machine upon the water, a lifting plane for contact with the water at a level below that of the floats, means operatively connected to the front of the plane to carry and to raise and lower the forward end of the same, and independently operable means operatively connected to the trailing end of the plane to carry and to raise and lower the trailing end of the same whereby the angle of the plane can be changed as well as the whole plane bodily raised or lowered, substantially as and for the purpose set forth.

2. In a hydroplane the combination of floats for supporting the machine upon the water, landing wheels supported below the floats, a forwardly disposed axle for the landing wheels cushioned against the under side of the floats, rearwardly directed thrust members connected at the forward end to the axle of the landing wheels and hinged at the rear end to the frame of the machine above the floats, a lifting plane for contact with the water at a level below that of the floats, means pivoted on a support which moves as one with the rearwardly directed thrust members aforesaid and operatively connected to the front of the plane to carry and to raise and lower the same and means pivoted on a support which moves as one with the said thrust members and operatively connected to the trailing end of the plane to carry and to raise and lower the same whereby the angle of the plane can be changed as well as the whole plane bodily raised or lowered, substantially as and for the purpose set forth.

In testimony whereof I have signed my name to this specification.

THOMAS SLOPER.